June 20, 1939.  J. K. CHRISTMAS  2,162,700
VEHICLE TRACK CHAIN
Filed Sept. 20, 1937
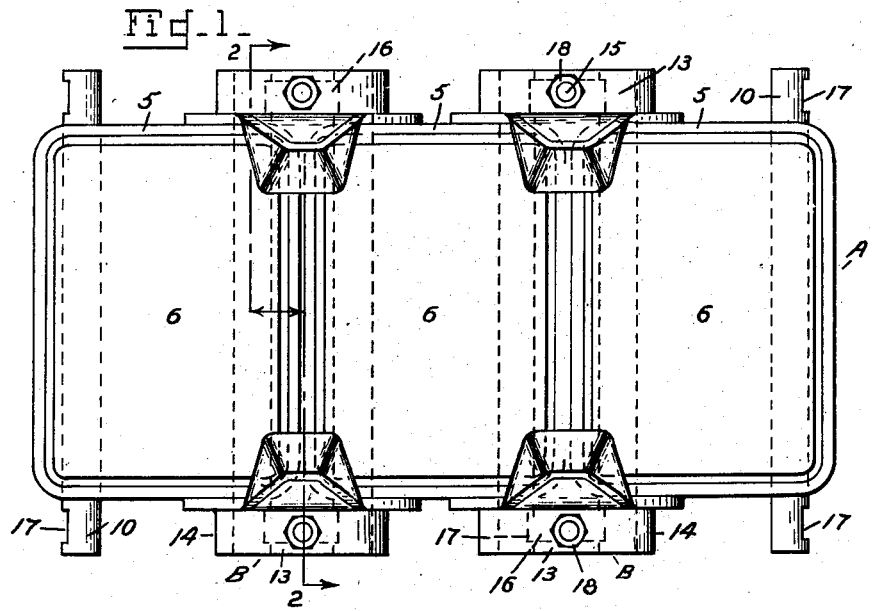
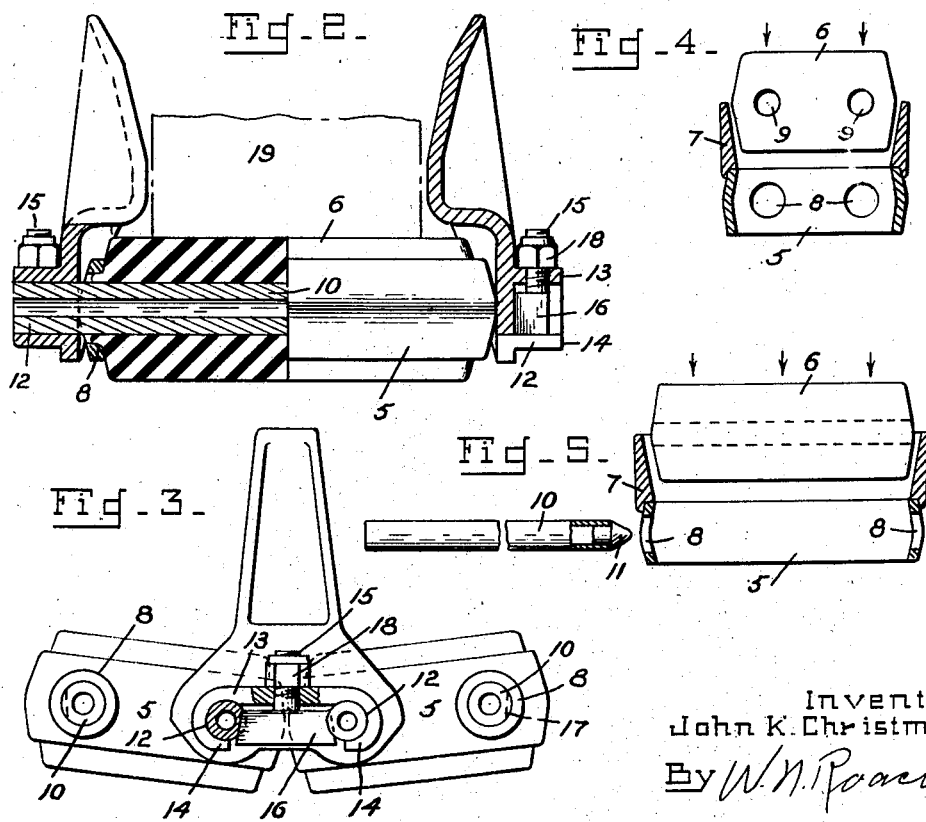
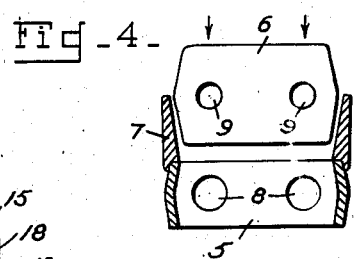
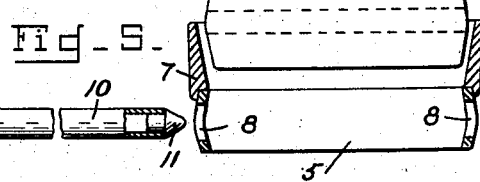
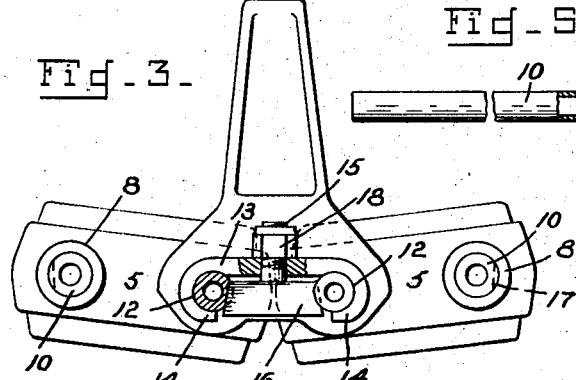
Inventor
John K. Christmas
By W. N. Roach
Attorney Patented June 20, 1939

2,162,700

UNITED STATES PATENT OFFICE 2,162,700

VEHICLE TRACK CHAIN

John K. Christmas, United States Army, Easton, Pa.

Application September 20, 1937, Serial No. 164,748

5 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a vehicle track chain.

The purpose of the invention is to provide an inexpensive, simple and easily assembled endless track chain which is characterized by a novel shoe of the rubber block type. A rubber block is forced into an encircling metal band which supports and restrains lateral expansion of the block under the load of the vehicle and the pull of the chain in passing about the sprockets.

A further object of the invention is to provide a simple and effective mounting of the link pins in the rubber block whereby the block will firmly grip the link pins so that angular movement of adjacent track shoes is permitted by distortion of the rubber surrounding the link pins.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view of a portion of the lower flight of a track.

Fig. 2 is a sectional view on the line 2—2 of Fig. 1.

Fig. 3 is a view in side elevation.

Figs. 4 and 5 are schematic views illustrating the manner of assembling the elements of the shoe.

The track chain consists of a series of shoes A connected and held in longitudinally spaced relation by links B.

The shoes are all identical and each comprises a metal enclosing band 5 whose walls are angular in cross-section with the angle directed outwardly and the opposite portions inwardly convergent. A decahedral block 6 of rubber or rubber-like material, having side walls complementary to the band, is carried by the band, and is forced into place by being moved through a removable assembling funnel 7 which is fitted on one side of the band. The block 6 is of greater height than the band to form inner and outer treads, the outer tread engaging the ground and the inner tread forming a rail for the wheels of a vehicle.

The opposite side walls of each band 5 are formed with two sets of aligned apertures 8 and each block 6 is provided with a pair of transversely disposed passages 9 which when the block is assembled in its band, are in alignment with a set of the apertures 8 in the band. A link pin 10 having a diameter greater than that of the passage 9 is forced through the passage and in this operation a portion of the rubber is squeezed into the apertures 8 in the band. In order to facilitate the insertion of the link pin it is adapted to carry a removable point 11. When the link pin is in place it is gripped firmly by the rubber and held against rotation. Its ends project beyond the band 5 to be available for mounting the links B.

The links B are similar to those shown in Patent No. 1,966,450 of July 17, 1934, and each has a pair of apertures 12—12 for mounting on the projecting ends of adjacent link pins of adjacent shoes. On the outer side of each link is a laterally extending flange 13 which has turned ends 14—14 to hook over the link pins, and constitute driving lugs for engagement with the sprocket of the vehicle. A bolt 15 insertable between the link pins and through the flange has a wedge-shaped head 16 held in slots 17—17 of the link pins when a nut 18 is applied. This connection holds the link in place and locks the associated link pins against independent rotational movement.

The shoes are permitted to move angularly relative to one another by distortion of the rubber surrounding the link pin.

When the track is mounted on a vehicle and is in operation, the weight of the vehicle is transmitted through its rollers, indicated at 19, which act to compress the block and tend to expand them laterally into closer engagement with the supporting and encircling band 5. The pull of the track is taken by the rubber block but the block will not fail because of the support afforded by the band.

I claim:

1. In a track chain for vehicles, a series of spaced shoes, each shoe including a metal band having walls angular in cross-section with the angle directed outwardly, a decahedral block of rubber or rubber-like material having walls complementary to those of the band and forced into the band, said block being of greater height than the band to form inner and outer treads and a pair of link pins forced through the rubber and gripped thereby, the ends of the link pins projecting beyond the band, and links rigidly connecting the projecting ends of adjacent link pins of adjacent shoes.

2. In a track chain for vehicles, a series of spaced shoes, each shoe including a metal band, a block of rubber or rubber-like material forced into the band and gripped thereby, said block being of greater height than the band to form inner and outer treads extending beyond the band and a pair of link pins passing through the block and gripped thereby, and links rigidly connecting adjacent link pins of adjacent shoes.

3. In a track chain for vehicles, a series of spaced shoes, each shoe including a block of rubber or rubber-like material having inner and outer tread portions, a metal band encircling and gripping the block between the tread portions, a pair of link pins passing through the block and gripped thereby and also passing through the band, and links rigidly connecting adjacent link pins of adjacent shoes.

4. In a track chain for vehicles, a series of spaced shoes, each shoe including a block of rubber or rubber-like material having inner and outer tread portions, a metal band encircling and gripping the block between the tread portions, and means for connecting adjacent shoes.

5. In a track chain for vehicles, a series of spaced shoes, each shoe including a metal band having walls angular in cross-section with the angle directed outwardly, a block of rubber within the band and gripped thereby, said block being of greater height than the band to form inner and outer tread portions, and means for connecting adjacent blocks.

JOHN K. CHRISTMAS.